May 1, 1945.　　　G. K. McKEE　　　2,374,874
MACHINE TOOL
Filed Aug. 3, 1940　　　6 Sheets-Sheet 1

INVENTOR.
GEORGE K. McKEE
BY
Joseph A. Rave
ATTORNEY.

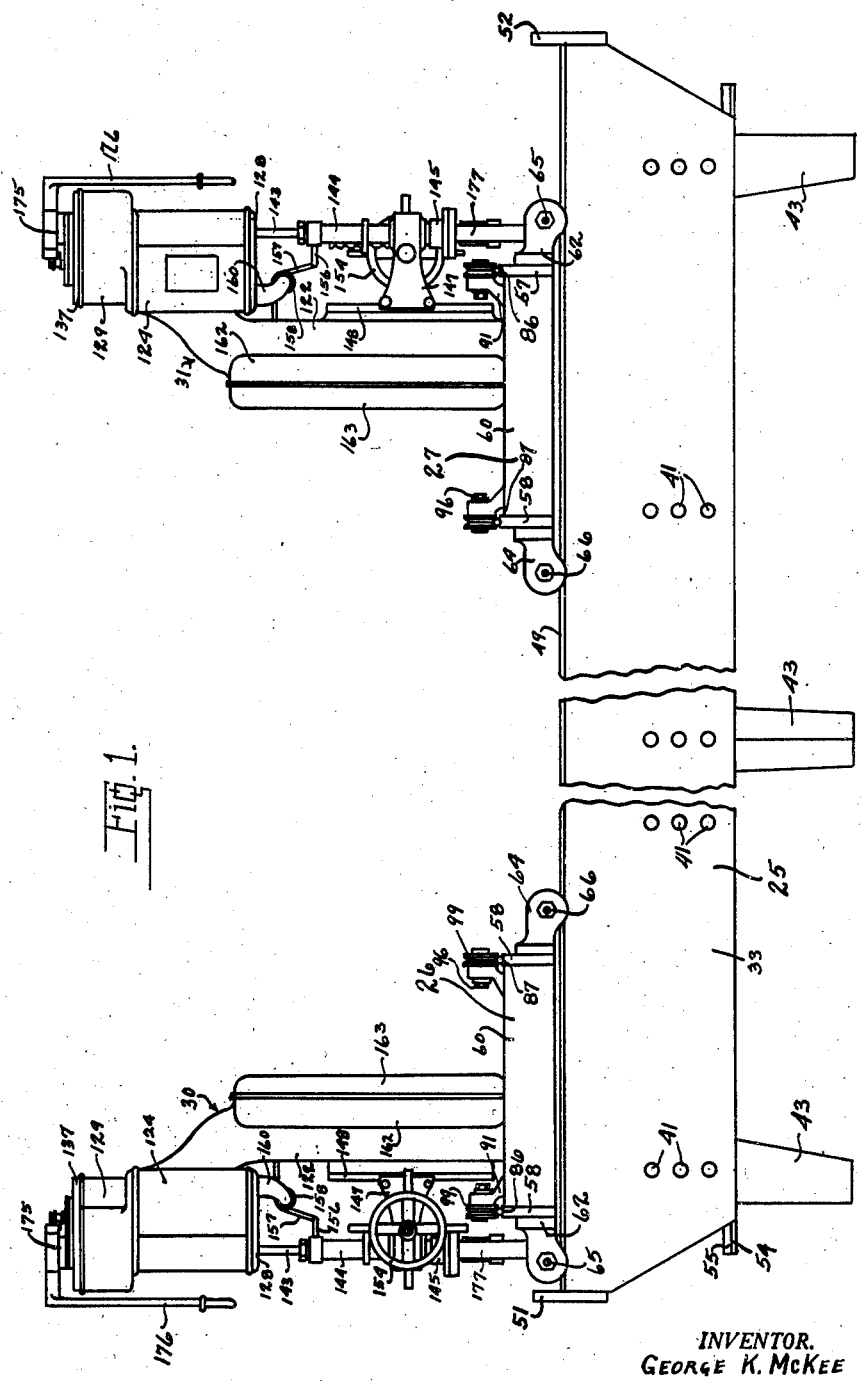

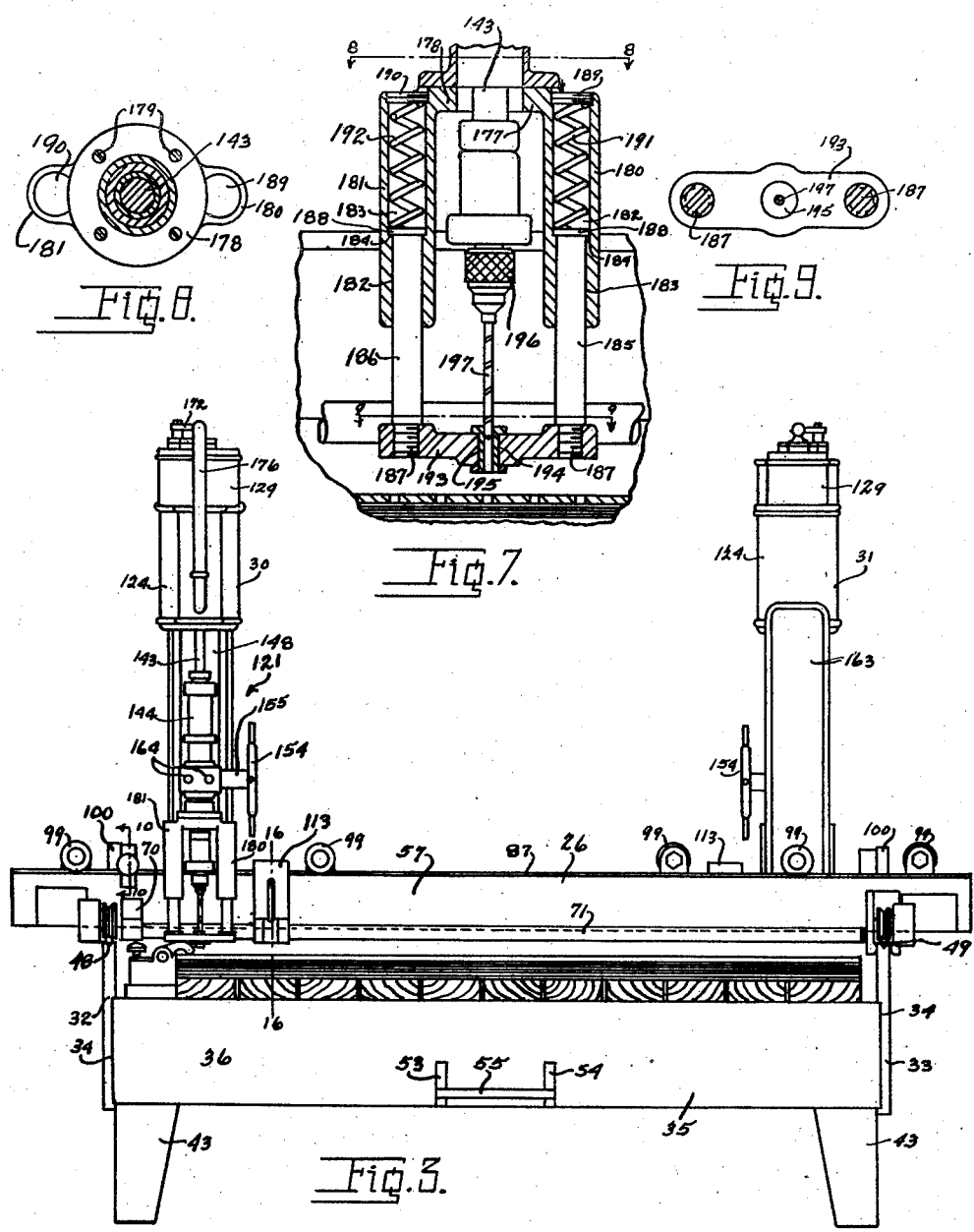

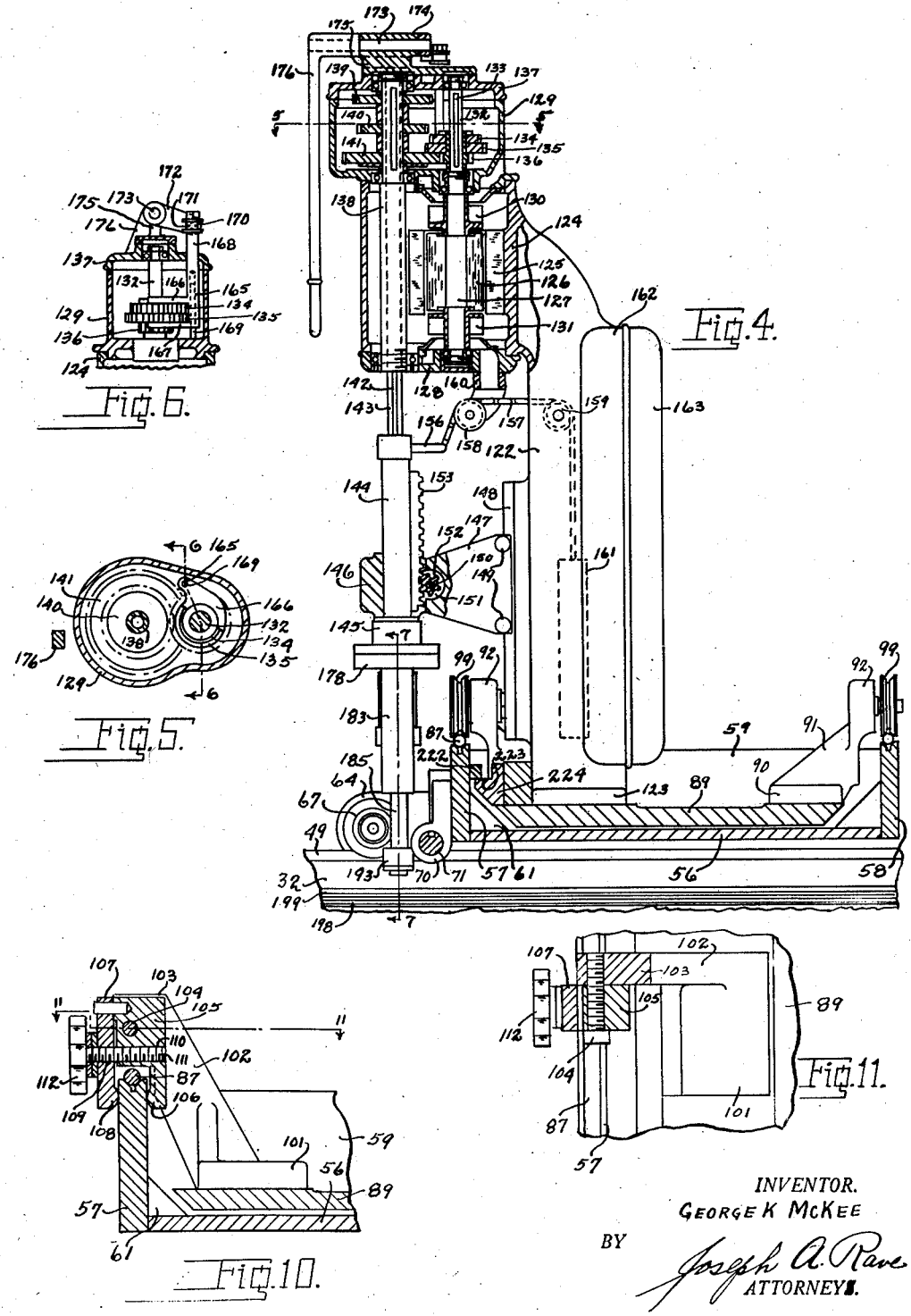

May 1, 1945.  G. K. McKEE  2,374,874
MACHINE TOOL
Filed Aug. 3, 1940  6 Sheets-Sheet 5
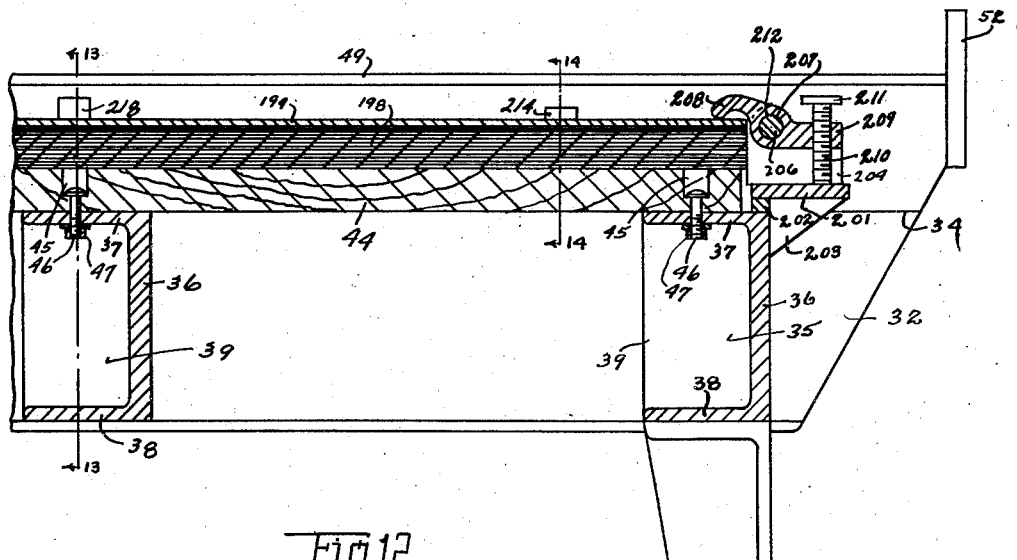
Fig. 12.
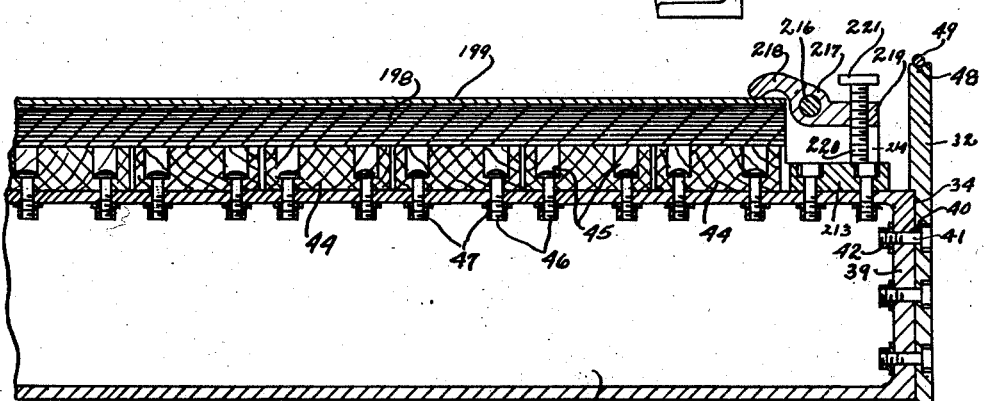
Fig. 13.
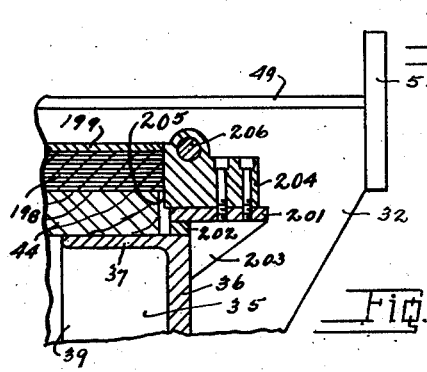
Fig. 15.
Fig. 14.
INVENTOR.
GEORGE K. McKEE
BY
Joseph A. Rave
ATTORNEYS.

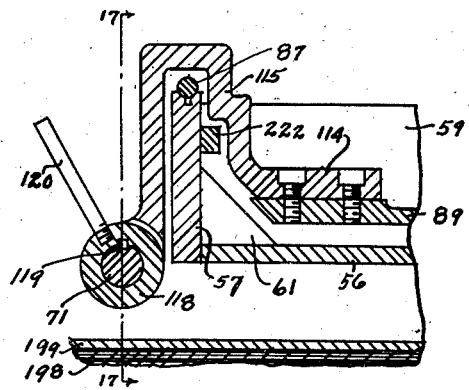
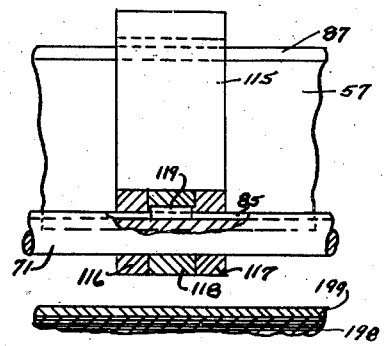
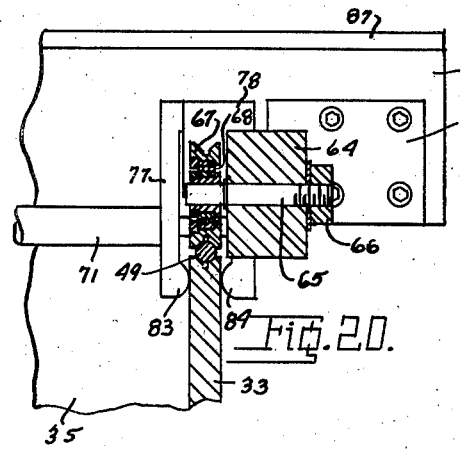
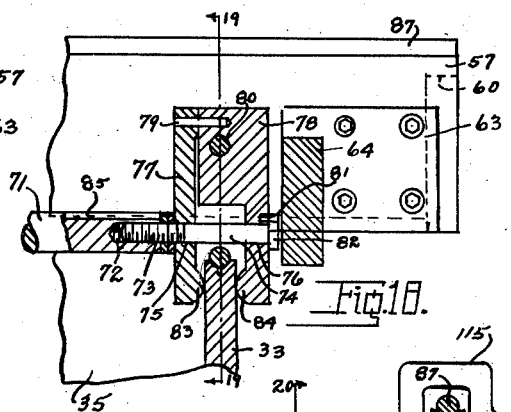
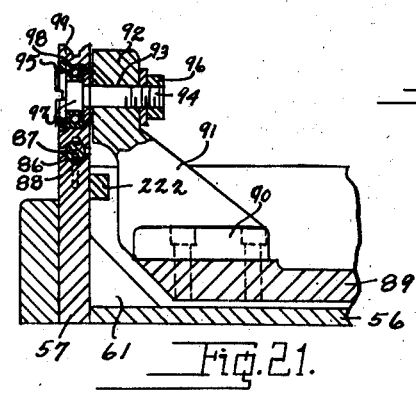
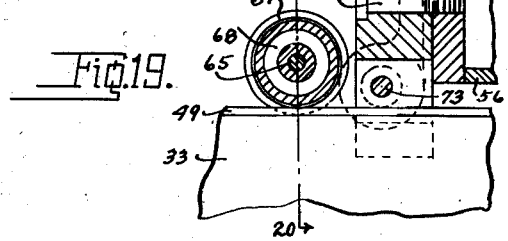
INVENTOR.
GEORGE K. McKEE Patented May 1, 1945

2,374,874

UNITED STATES PATENT OFFICE 2,374,874

MACHINE TOOL

George K. McKee, Cincinnati, Ohio, assignor to The Avey Drilling Machine Company, Covington, Ky., a corporation of Ohio Application August 3, 1940, Serial No. 350,403

5 Claims. (Cl. 77—5)

This invention relates to improvements in a machine tool, and particularly to a drilling machine.

It is one of the chief objects to provide a drilling machine for drilling holes in relatively large area work pieces, such as sheets or plates as employed in aeroplane fuselages, electric generators, and the like.

Another object is to provide a machine as above referred to which will expeditiously and efficiently cover the large areas to be drilled, whereby all portions of the work may be accessible to the drills.

A further object of the invention is the provision of such a drilling machine, whereby a large number of work pieces may be simultaneously operated upon, and each piece accurately machined in accordance with a master templet.

Another object of this invention is the provision of a machine for accomplishing the above objects, which is simple to operate; inexpensive to manufacture or produce; low in maintenance and operating costs and capable of producing work accurately and expeditiously.

It is also an object of this invention to provide a machine of the type above indicated, which will traverse the work in all directions, and in which the drilling mechanism is readily secured against movement during the actual tooling or drilling operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a side elevation of an embodiment of this invention in a drilling machine; the machine being illustrated as having portions of its bed broken away for illustration purposes.

Fig. 3 is an end elevational view of the machine shown in Figs. 1 and 2, as seen from the left hand end thereof.

Fig. 4 is an enlarged, fragmentary, vertical, sectional view, partly in elevation and partly in section, taken on line 4—4 of Fig. 2.

Fig. 5 is a horizontal, sectional view, taken on line 5—5 of Fig. 4.

Fig. 6 is a fragmentary, vertical, sectional view, taken on line 6—6 of Fig. 5.

Fig. 7 is an enlarged, fragmentary, sectional view through the drill guide, taken on line 7—7 of Fig. 4.

Fig. 8 is a horizontal view, partly in elevation and partly in section, taken on line 8—8 of Fig. 7.

Fig. 9 is a horizontal view taken in a plane below that of Fig. 8, on line 9—9 of Fig. 7.

Fig. 10 is an enlarged, vertical, sectional view through the transverse carriage clamp, taken on line 10—10 of Fig. 3.

Fig. 11 is a fragmentary, horizontal, sectional view, taken on line 11—11 of Fig. 10.

Fig. 12 is an enlarged, vertical, sectional view through an end of the bed, showing its construction, taken on line 12—12 of Fig. 2, eliminating the structure of the longitudinal carriage.

Fig. 13 is a transverse, sectional view through the bed, taken on line 13—13 of Fig. 12.

Fig. 14 is a fragmentary, vertical, sectional view, illustrating one of the side work stops, taken on line 14—14 of Fig. 12.

Fig. 15 is an enlarged, fragmentary, vertical, sectional view through one of the end work stops, taken on line 15—15 of Fig. 2.

Fig. 16 is an enlarged fragmentary, vertical, sectional view through the longitudinal carriage clamp operating mechanism, taken on line 16—16 of Fig. 3.

Fig. 17 is a fragmentary, sectional view, taken on line 17—17 of Fig. 16.

Fig. 18 is an enlarged, fragmentary, vertical, sectional view through the longitudinal carriage clamp, taken on line 18—18 of Fig. 2.

Fig. 19 is a fragmentary, sectional view, taken at right angles to Fig. 18, on line 19—19 of said Fig. 18.

Fig. 20 is a fragmentary sectional view, taken in a plane ahead of Fig. 18, on line 20—20 of Fig. 19.

Fig. 21 is an enlarged, fragmentary, vertical, sectional view, taken on line 21—21 of Fig. 2.

Throughout several views of the drawings, similar reference characters are employed to denote the same or similar parts.

Figure 2:
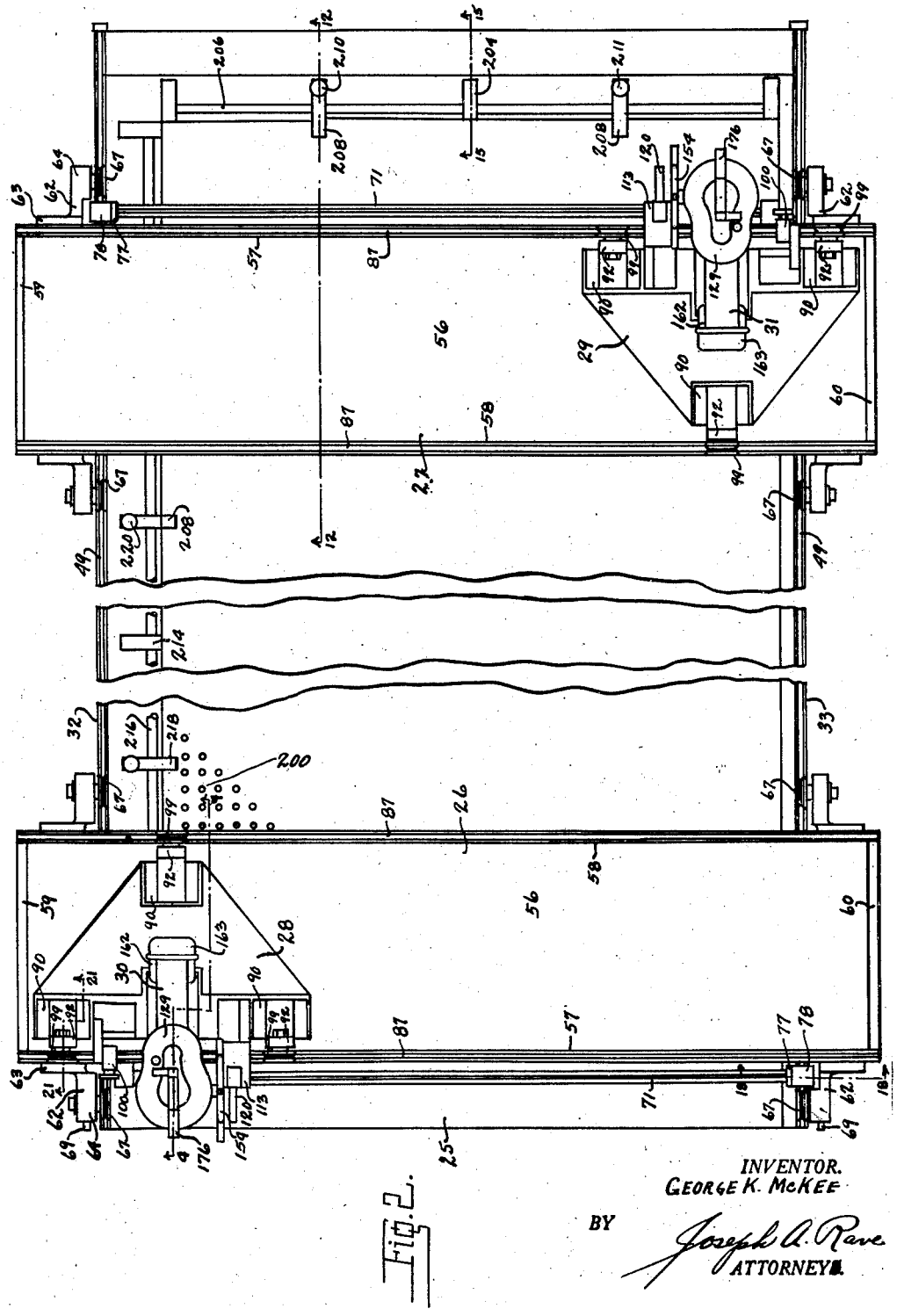
Fig. 2 is a top plan view of the portions of the machine shown in Fig. 1.

As was noted above, this invention pertains to a drilling machine, and the embodiment shown in the drawings is primarily adapted for drilling a large number of holes in a relatively large, flat surface, such as the rivet or bolt holes in aeroplane fuselage plates, electric turbine blades and similar articles. At the same time, the machine illustrated is capable of performing this operation in a large number of similar work pieces, that is, a stack of such plates and blades.

The machine in general comprises a supporting bed 25, on which is mounted for longitudinal movement a pair of carriages 26 and 27. Each of the longitudinal carriages has mounted thereon a transverse carriage 28 and 29 which respectively support a drilling head or unit 30 and 31, as well as auxiliary equipment, such as the carriage locking clamps and their actuating mechanisms, which will later be described in detail. In addition, the bed 25 includes means for positioning and securing the work to be operated upon.

Bed

The bed 25 comprises a pair of longitudinal rail or side members 32 and 33, each of which, near its lower side, is undercut or grooved, as at 34 in Fig. 13, for receiving the opposite ends of cross braces. These cross braces are each substantially identical and indicated in the drawings by the reference numeral 35. The cross braces are U-shaped or channels comprising a body or web portion 36, from the opposite ends of which are the arms 37 and 38, as clearly illustrated in Fig. 12. The ends of the channels are closed by end flanges 39, see Fig. 13. The end flanges 39, and abutting portion of the sides or rails 32 and 33, are provided with a plurality of axially aligned countersunk bores 40 for the reception of bolts 41 receiving suitable nuts 42 interiorly of the bed. Secured to the lower brace flanges 38, at appropriate points, shown in the drawings as at the four corners of the bed and centrally of its length, are suitable supporting legs 43. It should be noted that these parts, in addition to being bolted to one another, may be welded for rigidity and strength.

Mounted on the upper brace flanges 37 are a plurality of hardwood planks 44, each spaced from the other and each provided at the point where it contacts the transverse braces 35 with a pair of counter bored apertures 45, registering with similar bores in the flange 37 for the reception of headed bolts 46, such as carriage bolts or the like. Threadedly secured to the bolts 46, below the brace flanges 37, are nuts 47 which hold the parts to one another.

The hardwood planks 44 provide a bed into which the drills bite in penetrating the lowermost piece of work in a stack, as will later be pointed out.

The upper surface or edge of the bed sides or rails is provided with a V-shaped notch 48, into which is laid a round rod 49 serving as a track for grooved wheels on the longitudinal carriages 26 and 27. The track rods 49 are secured in position by means of counter sunk bolts or screws 50, one of which is illustrated in Fig. 14, it being understood that as many of these bolts or screws will be employed, as is considered necessary. The ends of the sides or rails 32 and 33 are each provided with stops 51 and 52 which limit the movement of the longitudinal carriages on their track bars 49. In order that an operator may readily get on top of the bed planks 44, or on top of the work sheets thereon, the outermost cross braces 35, see Figs. 3 and 12, are provided with a pair of angle brackets 53 and 54 which have one of their legs bolted or otherwise secured to the web or body 36 and their other legs supporting a stop 55.

Longitudinal carriages

The longitudinal carriages 26 and 27 are each identically alike, and it is therefore deemed sufficient if but one of them be described in detail. Therefore, the carriage 26, see Figs. 2 and 4, is a relatively shallow rectangular box, open at its upper end, and comprises a base plate 56, to the longitudinal edges of which is welded or otherwise secured upstanding sides or rails 57 and 58. The transverse or remaining edges of the plate 56 has likewise welded or secured thereto ends 59 and 60. Suitable gussets or corner braces 61 are secured or welded in the corners provided by the upstanding sides or rails and the bottom, so as to strengthen these parts and more securely tie them to one another.

Secured to the opposite ends of the sides or rails 57 or 58 are the supporting rollers, which comprise a bracket 62, having a base 63 and an arm 64 projecting therefrom. The said arm is provided with an aperture for a bolt or axle 65 which is held in position by the nut 66. The projecting end of the bolt or axle has mounted thereon a grooved wheel 67, see Figs. 20 and 21. The grooved wheel or roller 67 is connected with its axle 65 by means of an anti-friction roller bearing 68 and a suitable sleeve or bushing. The grooved wheel 68 receives the track bars 49 of the bed sides or rails, and thereby guides the longitudinal carriage in its movement longitudinally in its bed. The bracket arm 64 may have projecting from it a bumper 69 adapted to engage with end stops 52 and 51 in limiting the movements of the carriages. At the same time, and since use is made of two longitudinal carriages on a single bed, these bumpers 69 engage one another to limit the movement of the carriages toward one another.

It will be appreciated that when drilling, the longitudinal carriage should be locked into position, and the carriage is therefore provided with a suitable locking or clamping mechanism. As shown in Figs. 3, 4, 18 and 19, this clamping mechanism comprises a bracket 70, secured to the outer face of one of the longitudinal carriage sides or rails 57 and 58, in which is oscillatably mounted one end of a shaft or bar 71. The other end of the shaft or bar 71 is provided with a threaded socket 72 receiving the threaded end 73 of a clamping bolt 74. The bolt 74 passes through axially aligned apertures 75 and 76 in clamping jaws 77 and 78. These jaws are pinned to one another at 79 for relative movement toward and from one another. One of the jaws, namely, 78, is in turn pivotally mounted on a bolt or screw 80 to the longitudinal carriage side or rail 57 or 58. It should also be noted that the bolt 74 is held against rotation movement by any suitable means, such as pin 81 carried by the jaw 78 and extending through a slot or groove in the bolt head 82. The lower ends of the jaws 77 and 78 are thickened as at 83 and 84 to provide gripping means adapted to engage the sides of the rail at a point below the upper end thereof.

It will readily be appreciated that by rotating or oscillating the shaft or bar 71, the threaded socket 72 will draw the bolt 74 to the left as seen in Fig. 18, and thereby tend to bring the clamping jaws to one another about the axis of the bolt or screw 80. This relative movement of these parts causes the gripping fingers 83 and 84 to securely grip the sides of the rail and prevent longitudinal movement of the carriage. The means for operating or oscillating the shaft or rod 71 is carried by the transverse carriage, and will be described in detail hereinafter. It should be noted, however, that the shaft or rod 71 is provided with a longitudinal spline 85 for the operating mechanism. The upper ends of the sides or rails 57 and 58, similar to the bed sides or rails 32 and 33, are each provided with a V-shaped groove 86 receiving a track bar or rod 87. These track bars are secured in position by means of counter-sunk bolts or screws 88, one of which is illustrated in Fig. 21.

*Cross carriage*

The cross carriages 28 and 29, similar to the longitudinal carriages 26 and 27 are substantially identical in construction, as is the mechanisms carried thereby, and it is therefore deemed sufficient if but one of them be described in detail. Accordingly, cross carriage 28 is a relatively flat cast plate shown in cross section in Fig. 4 and indicated by the reference character 89, and this carriage, for convenience, is substantially triangular shaped in plan, as seen in Fig. 2. At each of the corners of the plate 28, there is provided a bracket, shown in cross section in Fig. 21, comprising a base member 90 adapted to be suitably bolted to the carriage plate 28 and having rising therefrom an arm 91 terminating in a head 92 provided with a bore 93. Disposed in said bore 93 is a bolt or axle 94 having at one end a head 95 and at its other threads for a nut 96. Immediately behind the head 95, there is provided a bearing 97 for an anti-friction ball bearing 98 carried by a grooved wheel or roller 99 which is substantially identical with the grooved wheel or roller 67, above described. The wheel 99, through its groove, tracks on the track bar 87 for guiding the cross carriage in its movement longitudinally of its longitudinal carriage 26 and 27.

As was noted above, this wheel supporting mechanism is mounted at each corner of the triangular shaped cross carriage plate, thereby supporting the carriage at three points. For ease in operation, and to insure the three point support of the carriage, one of said wheels or rollers is of the construction illustrated in Fig. 20, which permits of a certain amount of floating on its axle, thereby insuring proper alignment of the rollers with their track bars, should, for some reason, the said track bars be slightly out of alignment throughout their length. It should be noted, as was above intimated, certain of the wheels or rollers on the longitudinal carriages are floating, as in Fig. 20, while the others are fixed as in 21 for the same reason, to insure proper engagement of the wheels with the track bars on the bed sides or rails and to compensate for possible mis-alignment of these parts.

The cross carriage, similar to the longitudinal carriage, must be clamped or secured into position on its longitudinal carriage when a tooling or drilling operation is being performed. For this reason, there is provided, adjacent one of the wheel mechanisms at the front or operating side of the carriage, for example adjacent the left hand wheel mechanism as seen in Fig. 3, a clamping mechanism indicated in general in the drawings by the reference character 100. This clamping mechanism is shown on an enlarged scale in Figs. 10 and 11 and comprises a base 101 adapted to be bolted to the carriage plate 89 and has upstanding therefrom an outwardly, upwardly inclined arm 102 having a head portion 103 which overlies the longitudinal carriage side or rail 57 and its track bar. Pivotally secured to the head 103, as by the screw or bolt 104, is a clamping jaw 105, whose lower end is enlarged at 106 to engage the inner surface of the side or rail 57 at a point below the grooved edge. Pinned to the upper end of the jaw 105, so as to have relatively oscillating movement, is a jaw 107 whose lower end is enlarged at 108 to engage with the outer surface of the side or rail 57 at a point in opposition to that engaged by the jaw 105. The jaw 107, at a point intermediate its thickened portion 108, and the pivot bolt 104 of the jaw 105, is provided with a plane aperture 109 which is in axial alignment with a threaded aperture 110 in the jaw 105. Disposed in the apertures 109 and 110 is a clamp bolt 111, having a knob 112 at the outer or free end thereof.

It is believed that the operation of this clamping mechanism is self evident, since rotation of the clamp bolt 111 in one direction will tend to urge the jaws toward one another and thereby cause a clamping action between the jaws' thickened or enlarged ends 106 and 108, while rotation of the clamp screw in the opposite direction will release said jaws and thereby the clamping pressure.

It should be noted at this time that the mechanism for operating the longitudinal carriage clamping mechanism is likewise carried by the cross carriage and is located on the carriage adjacent the other forward guide wheel supporting mechanism, and is indicated in general by the reference character 113 in Fig. 3. This carriage clamping mechanism is shown on an enlarged scale in Figs. 16 and 17 and comprises a base member 114, from which rises a U-shaped arm 115, so formed as to follow the outline of the longitudinal carriage side or rail 57. At the lower end of the outer arm of the bracket 115, there is provided a forked bearing or fingers 116 and 117. Disposed between the fingers 116 and 117 is a sleeve or collar 118, having secured in its bore a key 119 adapted to be disposed in the key way or spline 85 provided in the bar or shaft 71. Projecting from the sleeve or collar 118 is a lever 120 adapted for oscillating the said collar and through its key 119 oscillating the shaft or rod 71.

The operation of this mechanism is believed obvious, since the oscillation of the collar 118 in a counterclockwise direction, as seen in Fig. 16, will correspondingly operate the shaft or bar 71 thereby, through its threaded socket 72, turn the head 82 of the bolt 74 to the left, as seen in Fig. 18, and cause the clamp jaws 77 and 78 to engage the bed side or rail. It will be noted from the above, and particularly from Figs. 2 and 3, that the longitudinal and cross carriage clamps are grouped closely adjacent one another, and as will later be made clear are at all times adjacent the drill feeding mechanism which is carried by the cross carriage for adjustment to the point of actual tooling or drilling operation.

*Drill driving and feeding mechanism*

The drill driving and feeding means, indicated in general by the reference character 121, is located at the forward side of the cross carriage plate 89 substantially centrally thereof, as seen in Fig. 2, and in between the longitudinal carriage clamp mechanism and the cross carriage clamp mechanism 100, as seen in Fig. 3. This mechanism is illustrated on an enlarged scale in Figs. 4, 5 and 6, and comprises an upstanding column 122 having a base 123 adapted for bolting the column to the carriage plate 89. The upper end of the column 122 is outwardly disposed and provided with a housing 124 adapted to overlie the longitudinal carriage rail 57 and project outwardly thereof. Secured within the housing 24 is the motor field laminations 125 encircling the armature laminations 126 which carry the motor shaft 127. The motor shaft 127 is journaled at its lower end in an anti-friction bearing carried by a closure plate 128, while the upper end of the shaft is journaled in anti-friction bearings supported by a gear case or housing 129. The motor shaft 127, between the armature 126 and its bearings, is provided with fans 130 and 131 adapted to circulate air through the motor for cooling purposes.

Disposed within the gear housing 129 is a shaft 132, shown as an extension of the motor shaft 127, which is provided longitudinally thereof with a key 133. Slidably mounted on the shaft 132 is a gear cluster comprising three pinions 134, 135 and 136, each provided with a spline or key way receiving the key 133 of the shaft 132. The upper end of the shaft 132 is journaled in an anti-friction ball bearing carried by a closure cap 137.

Within the gear housing 129, and parallel with the shaft 132, is a driven sleeve 138 journaled in anti-friction bearings provided by the closure cap 137 and gear housing 129. Keyed or otherwise secured to the sleeve 138 are three spur gears 139, 140 and 141, adapted respectively to be meshed with the pinions 134, 145 and 136.

The sleeve 138 projects through the column housing 124 and has its lower end journaled in an anti-friction ball bearing supported by the closure plate 128. The sleeve 138 is provided interiorly thereof with one or more keys received in a spline 142 in spindle 143.

The spindle 143, in addition to being journaled in the sleeve 138 is journaled in suitable anti-friction bearings carried by a quill 144, and the spindle below the quill has secured to it a drill mounting chuck 145. The quill 144 is mounted against rotation, but for sliding movement in a bearing 146 at the forward end of an adjustable bracket 147 having the usual dove-tail connection with the dovetail guide 148 in the forward face of the column 22. The bracket 147 is adapted to be vertically adjusted relative to the guide 148 and secured in adjusted positions by suitable clamp means, such as clamping bolts 149. In order to effect the adjustment of the quill 144 relative to the bearing 146, the bracket 147 has journaled transversely thereof a shaft 150 having secured thereto, within a cavity 151 in said bracket, a rack pinion 152 which meshes with a suitable rack 153 bolted or otherwise secured to the quill 144. In order to rotate the shaft 150 and therefore the pinion 152, the outer end of said shaft is provided with a suitable hand wheel 154. Sheathing and journalling the shaft 150 between the hand wheel 154 and bracket 147 is a sleeve 155, see Fig. 3. In order to assist in the vertical movement of the quill 144 and parts carried thereby, the upper end of the quill 144 has projecting from it an arm 156 to which is pivotally connected one end of a chain or cable 157 which passes over idler pulleys 158 and 159. The idler pulley 158 is journaled in a bracket 160 secured to or integral with and depending from the closure plate 128, while the idler pulley 159 is journaled interiorly of the upright or column 122. The other end of the chain or cable 157, and within the column 122, has secured thereto a counter weight 161.

The rear of the upright or column 122 is provided with a box 162 containing the usual electrical equipment, such as switches, relays, fuses and the like, usual in machine tools for operating and safeguarding electrical motors. The box 162 is closed by a cover 163, and projecting from this box are suitable, flexible, electrical cables extending to the electric source, whereby the drill rotating and feeding mechanisms may cover the entire surface of the bed due to the movements relative thereto of the longitudinal carriages 26 and 27 and cross carriages 28 and 29. In order to effect the operation and control of the electric motor, suitable switches, see Fig. 3, are mounted at the forward end of the bracket 147 and are indicated by push buttons carrying reference character 164.

It will be appreciated that the gears in the gear box 129 constitute a change speed mechanism effected by the connection of the various gear pinions 134, 135 and 136 with their respective fixed gears 139, 140 and 141. In order to shift the gear pinions, use is made of a shifter fork 165 embracing the said pinions by having one of its arms 166 lying on the upper surface of the pinion 134 and the other arm 167 lying below the pinion 135. The fork 165 is integral with a rod 168 which has its lower end hollow and receiving guide pin or bar 169. The upper end of the shifter rod 168 is provided with a slot 170 receiving shifter pin 171 at the free end of a lever 172. The lever 172 is pinned or otherwise secured to the end of a rock shaft 173, oscillatably journaled in a bearing 174 formed integral with a bracket 175 mounted on the upper surface of closure cap 137. The other end of the rock shaft 173 has pinned or otherwise secured to it the operating lever 176.

It is believed that the operation of this mechanism is well understood, since the movement of the lever 176 from the position shown in Fig. 6 to the right will elevate the pinions, disengaging the pinion 136 from gear 141 and sequentially meshing pinion 135 with gear 140 and pinion 134 with gear 139, for thereby changing the ratio between the motor shaft extension 137 and driven sleeve 138 to change the speed of rotation of the spindle 143.

*Drill guide and work locating mechanism*

Secured to the spindle chuck 145 is a drill guiding mechanism, illustrated on an enlarged scale in Figs. 7, 8 and 9, and comprises a bracket 177 having a plate portion 178 adapted to engage the under surface of the chuck 145, and these parts attached to one another by screws 179. Depending from opposite ends of the plate member 178 are arms 180 and 181. The arms 180 and 181 are respectively axially bored, as at 182 and 183, with a shoulder 184 between said bores. Mounted in the bores in the arms are pins 185 and 186, each having their lower ends threaded as at 187 and their upper ends enlarged to provide heads 188 adapted to engage the shoulders 184. The upper ends of the bores 182 are closed by plugs 189 and 190, which act as abutments for the upper ends of coil springs 191 and 192, which abut on their other ends with the heads 188 of pins 185 and 186. The lower threaded ends 187 of the pins 185 and 186 are screwed into tapped apertures at the ends of a bar 193 which is provided centrally thereof with a bore 194 for a removable drill guiding bushing 195.

Secured to the spindle 143, between the arms 180 and 181, is a drill chuck 196, adapted to have secured thereinto the usual drill 197. As will be seen in Fig. 7, the drill chuck 196 is in axial alignment with the bushing 195 so that the drill 197 is guided by the said bushing during its vertical movements and drilling operation.

Positioned on top of the wood planks 44, which in effect is the work supporting table, is a stack of work sheets or plates, indicated by the reference character 198. Disposed on top of the stack 198 is a work templet 199, having formed therein, as shown diagrammatically in Fig. 2, the holes 200 to be drilled in the work stack.

Suitable means are provided for positioning the work stack and templet relative to the bed, and which means are shown in plan in Fig. 2 as located along the left hand edge and upper edge thereof. These positioning and clamping means are shown on an enlarged scale in Figs. 12, 13, 14 and 15, and which show, for the upper end of the work in Figs. 12 and 15, the end cross channel 36 as being provided with an outwardly projecting ledge 201, bolted, welded or otherwise secured to the cross brace 36 and suitably spaced by a liner 202. In order to brace the ledge 201, use is further made of a triangular shaped support or gusset 203, having one of its edges secured to the vertical face of the cross brace 36. Mounted on the ledge 201, and bolted or otherwise secured thereto at a plurality of points, three for example, are blocks 204, each having a vertical face 205 in alignment with one another. These faces 205 constitute stops for positioning the upper end of the work pieces and templet, as seen in Fig. 2. In addition, the blocks 204 are each provided with an aperture in axial alignment with one another for a shaft or rod 206. The shaft or rod 206 is employed for supporting clamps for securing the work in position as determined by the stop blocks 204.

One of the clamps is illustrated in cross section in Fig. 12, and comprises a clamping member having an enlarged body portion 207, from one side of which projects a clamping finger 208, while from the other side projects a tail 209. Threaded through the tail 209 is a clamping screw 210, provided, on its upper surface, with a knob 211. The enlarged body portion 207 is provided with an aperture 212 for freely receiving the rod or bar 206.

The operation of the clamp is readily apparent, since rotation of the clamp screw 210 in a direction to elevate the tail 209 depresses the finger 208, thereby gripping the work plates 198 and templet 199 between the clamp finger and the planks 94, and reverse operation of the screw 210 positively lowers the tail 209 and elevates the finger 208.

The side positioning and clamping of the work pieces and templet is effected the same as that above described, and as illustrated in Figs. 13 and 14, comprises a flat bar or plate 213 which extends longitudinally of the bed and is bolted, welded or otherwise secured to the transverse brace channels 36. Mounted on the plate 213 are a plurality of blocks 214 similar in all respects to the blocks 204, and each comprising a vertical face 215 in alignment with one another. The blocks 214 are each provided with a bore in axial alignment with one another, in which is disposed and secured a rod or bar 216.

Loosely mounted on the rod or bar 216, between adjacent positioning blocks 214, are clamping fingers, again similar in all respects with the clamping fingers above described, and comprising an enlarged central portion 217 through which the rod or bar 216 passes. Projecting from the enlarged portion 217 to one side thereof is the clamping finger 218, while the tail piece 219 projects to the other side thereof. Threaded through the tail piece 219 is the clamp screw 220 having a knob 221 at its upper end.

The operation of this clamping mechanism is identical with that above described, namely, rotation of the clamp screw 220 in one direction actuates the clamping finger in a counterclockwise direction, as seen in Fig. 13, for clamping the work against the planks 44, while reverse rotation of the screw 220 reversely actuates the finger 218.

*Operation*

The operation of this machine, as illustrated in the drawings, is: the longitudinal carriages are moved to one end of the bed 25 and the work pieces slid onto the bed planks 44 beneath these carriages, with their one edge against the faces 205 of the blocks 204 and their other edge against the faces 215 of the blocks 214. It will be readily understood that the work pieces 198 may vary in number from one to the full capacity of the stack as determined by the clamps and positioning stop blocks. On top of the work, is then the templet 199 and all of these parts secured to one another and to the bed planks 144 by operating the clamp arms.

The longitudinal carriages 26 and 27 are then positioned at their proper starting point on the bed 25 which is of course effected manually by grasping the same and shifting them on the bed sides or rail track bars 49 and the anti-friction rollers or wheels 67 and 99. The longitudinal carriages are then secured in position through the operation of the handle 120 for actuating clamp shoes 77 and 78 toward one another and gripping one of said bed sides or rails. The cross carriages 28 and 29 are then shifted to the desired position on the longitudinal carriage, again manually by grasping same and moving them relative to the guide track bars 87 through the medium of the rollers or wheels 67 and 99. The cross carriages are then secured in position by actuating the clamp screw 111 to actuate clamp jaws 106 and 107 toward one another and engage one of the longitudinal carriage guides or rails 57 and 58.

The drill spindle and drill is then rotated through the operation of the switch 164 and the drill fed toward the work through the hand wheel 154. The movement of the hand wheel 154 causes the descent of the quill 144 and parts carried thereby, including the drill guide bracket 177. The guide bracket moves with the quill until the bar 193 engages with the top surface of the templet 199, whereupon the bar stops and the bracket and drill continue their descent to effect the drilling or tooling of the work 198. The stopping of the bar 193 correspondingly stops the descent of the pins 185 and 186 which causes a compression of the springs 191 and 192 during the drilling operation, which spring, upon reverse movement of the parts, exands until the pin heads 188 engage the shoulders 184, whereupon they move upwardly along with the bar 193. It will be noted that with this construction the drill guide bushing 195 is at all times guiding and supporting the drill during its operation and is adjacent the work, so as to afford the drill its maximum support during the drilling.

As each hole is drilled, or each tooling operation is completed, one or both of the carriage clamps is released, and the drill advanced to the next station or point of operation, whereupon the carriages are again secured and the drilling or tooling done. These operations are repeated until the work piece is completed, whereupon the work clamps are released and the finished work replaced with unfinished work.

In order to take care of the thrust on the drill during the drilling operation, and since the cross carriage is mounted for free movement on the longitudinal carriage, means are provided for conteracting this drill thrust. This means comprises the securing to the inner surface of the longitudinal carriage side or rail 57 a bar 222, beneath which is the nose 223 of a thrust 224, bolted, welded or otherwise secured to the forward face of the drill upright column 122 and the adjacent upper surface of the carriage plate 89, all as shown in Fig. 4. From this it will be readily seen that the tendency, due to tooling or drilling pressure, to lift the drill and thereby the carriage and carriage plate 89, will be effected.

From the foregoing, it is believed now evident that there has been provided a drilling machine for accomplishing the objects initially set forth.

What is claimed is:

1. In a drilling machine of the class described, the combination of a rectangular bed having sides and cross braces between said sides, a circular guide bar secured to the upper edge of each side, a longitudinal carriage having grooved guide wheels at substantially each corner of the longitudinal carriage engaging the guide bar for supporting and guiding said longitudinal carriage during its movement on the guide bars, a clamp mechanism for securing the longitudinal carriage to the bed at any point in its adjustment longitudinally thereof, comprising a pair of clamp jaws mounted on the longitudinal carriage for oscillatory movement toward and from one another and respectively located on opposite sides of one bed side, and a clamping screw for urging the clamp jaws toward one another to engage said bed side at a point just below the guide bar thereon.

2. In a drilling machine of the class described, the combination of a rectangular bed having sides and cross braces between said sides, a circular guide bar secured to the upper edge of each side, a longitudinal carriage having grooved guide wheels at substantially each corner of the longitudinal carriage engaging the guide bar for supporting and guiding said longitudinal carriage during its movement on the guide bars, a clamp mechanism for securing the longitudinal carriage to the bed at any point in its adjustment longitudinally thereof, comprising a pair of clamp jaws mounted on the longitudinal carriage for oscillatory movement toward and from one another and respectively located on opposite sides of one bed side, a clamping screw for urging the clamp jaws toward one another to engage said bed side at a point just below the guide bar thereon, a drilling unit on the longitudinal carriage for movement therewith relative to the bed and movement thereon longitudinally thereof, and clamp operating means associated with the drill unit and movable therewith relative to the longitudinal carriage.

3. In a drilling machine of the class described, the combination of a rectangular bed having sides and cross braces between said sides, a circular guide bar secured to the upper edge of each side, a longitudinal carriage having grooved guide wheels at substantially each corner of the longitudinal carriage engaging the guide bar for supporting and guiding said longitudinal carriage during its movement on the guide bars, a clamp mechanism for securing the longitudinal carriage to the bed at any point in its adjustment longitudinally thereof, comprising a pair of clamp jaws mounted on the longitudinal carriage for oscillatory movement toward and from one another and respectively located on opposite sides of one bed side, a clamping screw for urging the clamp jaws toward one another to engage said bed side at a point just below the guide bar thereon, a drilling unit on the longitudinal carriage for movement therewith relative to the bed and movement thereon longitudinally thereof, a clamp operating means associated with the drill unit and movable therewith relative to the longitudinal carriage, including an oscillatable bar oscillatably journaled on the carriage and having a threaded socket at one end for the clamp screw, and an oscillating handle splined to the oscillatable bar and axially movable relative thereto with the drill unit.

4. In a drilling machine of the class described, the combination of a rectangular bed, a carriage mounted thereon for longitudinal movement relative thereto, said carriage including sides or rails, circular guide bars at the upper edge of the sides or rails, a cross carriage having grooved guide wheels at opposite sides thereof for engaging the guide bars for guiding the cross carriage relative to the longitudinal carriage, a drill rotating and feeding unit carried by the cross carriage, clamping means for securing the cross carriage in adjusted positions, comprising a bracket upstanding from and overlying one of the longitudinal carriage rails, a pair of clamping jaws pivotally mounted on the bracket and located one on each side of the rail, and a clamping screw for urging said jaws toward one another to clampingly engage the rail.

5. In a drilling machine, the combination of a bed having rails extending longitudinally thereof, a first carriage mounted on said rails for movement thereon longitudinally of the bed, guide rails on said first carriage extending transversely of the bed, a second carriage mounted on the first carriage rails for movement thereon transversely of the bed, a self contained drill rotating and feeding unit on the second carriage and movable with said second carriage and first carriage relative to the bed, clamping means on said second carriage for securing same to the first carriage in adjusted positions, clamping means on the first carriage for securing same in adjusted positions, and operating means for said first carriage clamping means carried by said second carriage.

GEORGE K. McKEE.